Fig. 1.

July 2, 1946.  F. C. REGGIO  2,403,398
ENGINE REGULATING MEANS
Filed May 7, 1945  2 Sheets-Sheet 2

Inventor
F. C. Reggio

Patented July 2, 1946

2,403,398

UNITED STATES PATENT OFFICE 2,403,398

ENGINE REGULATING MEANS

Ferdinando Carlo Reggio, Norwalk, Conn.

Original application February 5, 1938, Serial No. 188,960. Divided and this application May 7, 1945, Serial No. 592,419

57 Claims. (Cl. 123—119)

1

This invention relates to supercharging and/or regulating means for internal combustion engines and more particularly to devices for regulating the pressure and/or temperature of the fluid in the engine induction system. The invention is particularly useful in connection with supercharged aircraft engines.

The present application is a division of my copending application Serial No. 188,960, filed February 5, 1938.

One of the objects of the invention is to provide means whereby the pressure and/or temperature of the air or mixture supplied to the engine may be efficiently regulated independently of variations of atmospheric pressure.

Another object of the invention is to provide a self-contained supercharger unit capable of delivering compressed air or mixture to one or more engines.

Another object of the invention is to avoid the considerable waste of power which occurs in the supercharger of engines designed for high altitude when operating at part throttle.

Still another object is to control the density of the air supplied to the engine independently of changes of altitude.

A still further object is to provide means for automatically regulating an operative condition which varies with—or is dependent upon—the engine air supply.

A further object is to provide a variable speed drive for the engine supercharger and means for automatically regulating the speed of the latter.

A still further object is to provide in combination with an aircraft engine a regulating device including a servo motor and operatively connected with control means adjustable while in flight by the pilot for automatically keeping the engine induction pressure, or density, at a value dependent upon the adjustment of said control means and independent of the altitude.

Still another object is to provide, for use with an engine having a gear-driven supercharger, an additional, first-stage supercharging unit including a variable-speed supercharger and means for automatically controlling the engine induction pressure and temperature independently of changes of altitude.

A still further object is to provide means for regulating the engine manifold or induction pressure or density, or an operative condition which is dependent upon or varies with the engine fuel supply or the engine induction pressure, as a preselected function of one or more variables such as the adjustment of manual control means and the surrounding atmospheric pressure.

Further and other objects and advantages will be apparent from the following description when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the following description and in the claims various details will be identified by specific names for convenience, but they are intended to be as generic in the application as the art will permit.

In conventional carburetor engines the power output is a function of the intake manifold pressure. Such pressure, and in turn the engine output, are controlled by means of a throttle valve. When, more particularly, aviation engines including a supercharger of large capacity designed for high altitude operate at low altitude, or at reduced power, or both, a large amount of the power required to drive the supercharger is wasted by throttling, causing a considerable rise in the temperature of the compressed air.

According to the present invention means may be provided for driving the supercharger at an infinite number of speeds, whereby the supercharger delivery can be adjusted to fit each altitude and operating condition within the designed limits.

Figure 1:
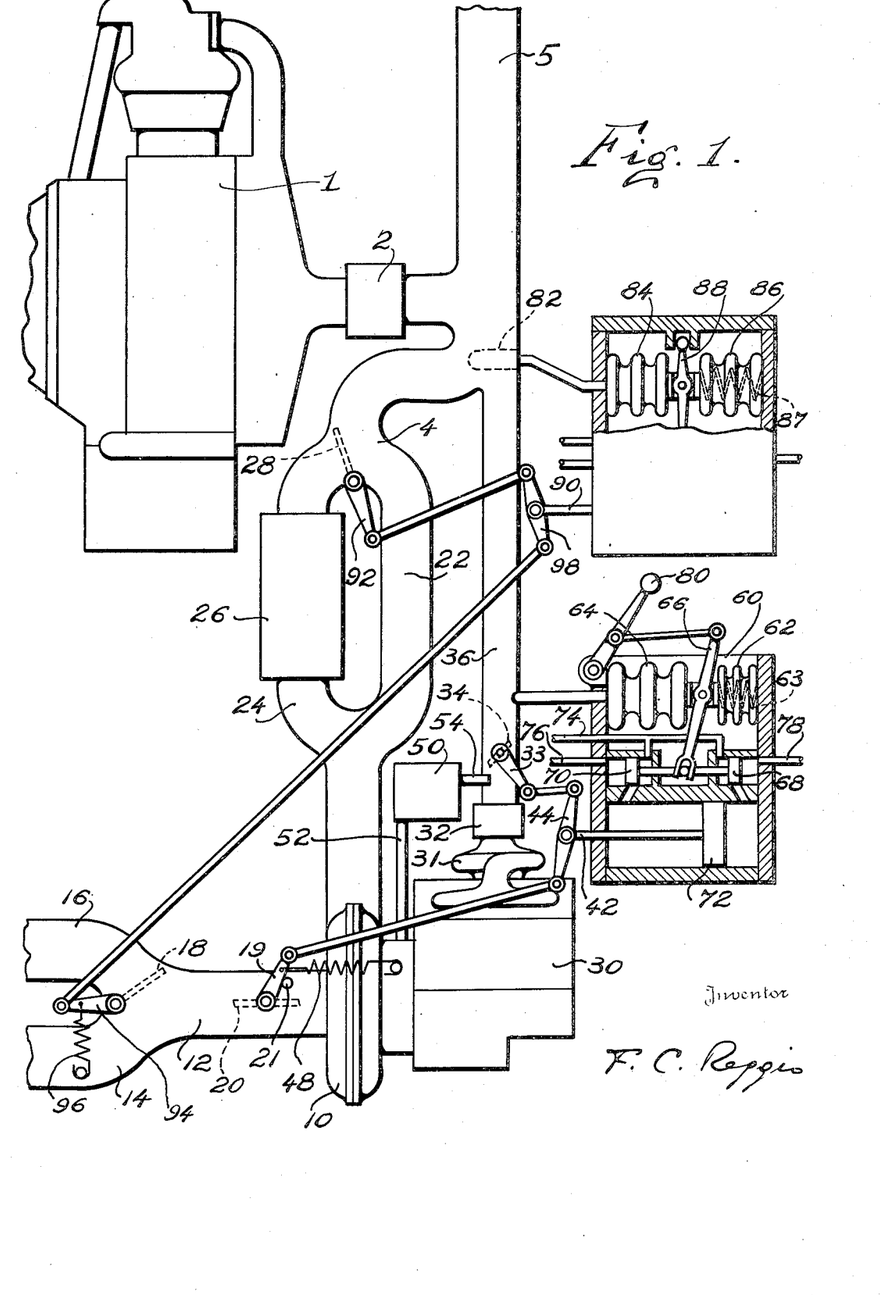
Figure 1 is a diagrammatic view of the engine in connection with the supercharger unit and the pressure and temperature regulators.

The invention is shown as applied to a conventional radial aircraft engine 1 having a carburetor 2 connected through a conduit 4 with a blower 10. Air is supplied to the blower through a conduit 12 having two branches 14 and 16 for leading cold and hot air respectively thereto. A valve 18 is placed at the junction of conduits 14 and 16 and is pivoted so that it may regulate the ratio of cold to hot air admitted to conduit 12 and thereby regulate the resultant temperature of the air in that conduit. A valve 20 is placed in conduit 12 and is adapted to restrict the free area of that conduit and thereby regulate the pressure at the blower intake.

Figure 3:
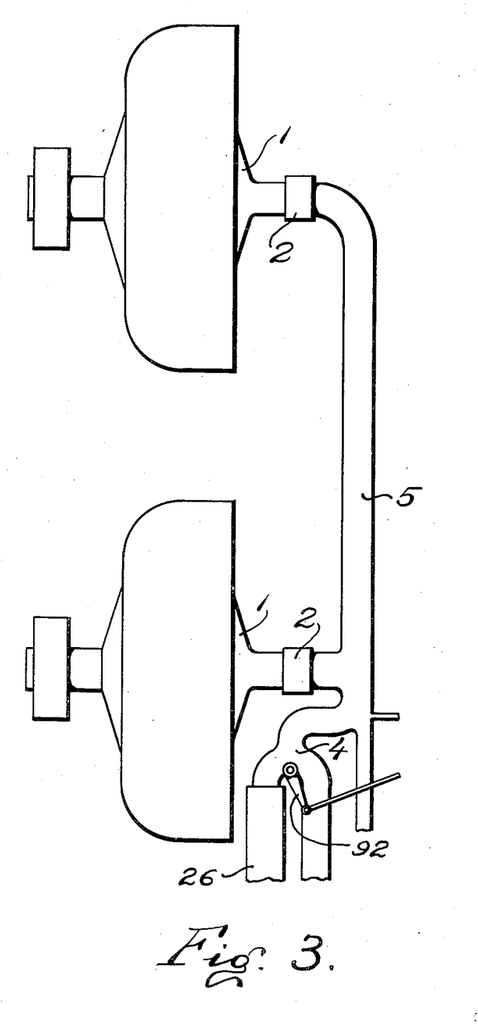
Figure 3 is a diagrammatic partial view of a modified construction including two engines.

The conduit 4 has two branches 22 and 24. The latter contains an intercooler, shown generally at 26. A valve 28 is placed at the junction of branches 22 and 24 and is pivoted so that it may regulate the proportion of air flowing through the intercooler and thereby control the temperature in conduit 4. The conduit 4 may extend beyond the engine 1 and form a conduit 5 to supply compressed air to other engine or engines, as shown in Figure 3.

The blower 10 is driven by an independent or self-contained motor. Although any type of variable speed motor may be used, its preferred form is disclosed in the drawings as an internal combustion motor 30 having a carburetor 32 to which air is supplied from conduit 4 through a duct 36 in which is placed a throttle valve 34. A conventional supercharger 31, driven by means of gears by the motor 30, is mounted between the carburetor 32 and the cylinders of the motor.

An idling speed governor, indicated generally at 50, prevents the motor 30 from stalling. In the preferred embodiment it consists of a centrifugal type governor, driven from the motor 30 through the flexible shaft 52, and controlling the position of an axially slidable rod 54 which, in turn, limits the clockwise rotation of lever 33 and thereby prevents the throttle valve 34 from restricting the free area of duct 36 below the value corresponding, for each valve of the pressure in the duct 36, to the idling speed of motor 30.

The governor 50 is so designed that its energy is substantially greater than the energy of a spring 48 one end of which is secured to the lever 19 controlling the valve 20. The spring 48, cooperating with a stop 21, tends to maintain the valve 20 in the open position.

A floating lever 44 is mounted at its median point, by means of a pivot, on an axially slidable rod 42 and its upper and lower ends are connected by means of suitable links with levers 33 and 19, respectively.

In the operation of the above described mechanism the pressure in conduit 4 is controlled by the axial displacement of the rod 42. Assuming said rod 42 to be initially in its extreme right position as shown in the drawings, both the valve 20 and the throttle valve 34 will be entirely open, whereby for a given value of the surrounding air density the motor 30 runs at its maximum speed, the air pressure in conduit 4 attains its maximum value and the engine 1 develops its maximum power output.

If now the rod 42 is displaced toward the left, while owing to the action of spring 48 the valve 20 remains in the open position, the throttle valve 34 is caused to rotate so as to restrict the free area of the conduit 36 and thereby reduce the speed of motor 30 and blower 10 and in turn reduce the value of the pressure in conduit 4 and the power output of the engine 1. Continued displacement of the rod 42 in the same direction will cause the speed of motor 30 to be further reduced until the rotation of lever 33 is stopped by the rod 54 operated by the governor 50. The motor 30 will then operate at idling speed, and the pressure in conduit 4 will be practically equal to the surrounding atmospheric pressure. Thereafter, upon continued displacement of the rod 42, the resistance opposed by the governor 50 to further rotation of lever 33 being substantially greater than the resistance opposed by the spring 48 to the rotation of lever 19, while the motor 30 is maintained at idling speed, the floating lever 44 will operate to progressively close the valve 20 and thereby reduce the pressure in conduit 4 to such a low value as may be required for idling speed of the engine 1. Obviously, when the rod 42 is displaced in the opposite direction back to its initial position, first the valve 20 will be open while the motor 30 is idling, and thereafter the speed of the motor 30 will be increased to its maximum value corresponding again to the maximum power output of the engine 1.

It is to be noted that in the foregoing the blower 10 has been assumed to be of the centrifugal type. Although the above mentioned type is particularly advantageous in the present system, it is to be understood that the invention is not limited thereto but that various other well known types of blower may be employed. If a blower of the positive displacement type is used, the pressure in the conduit 4 corresponding to idling speed of the engine 1 is obviously obtained for a value of the speed of motor 30 above the idling speed of said motor, the blower inlet being unrestricted, whereby the valve 20 and the floating lever 44 becomes unnecessary and the rod 42 may be linked directly to the lever 33.

Figure 2:
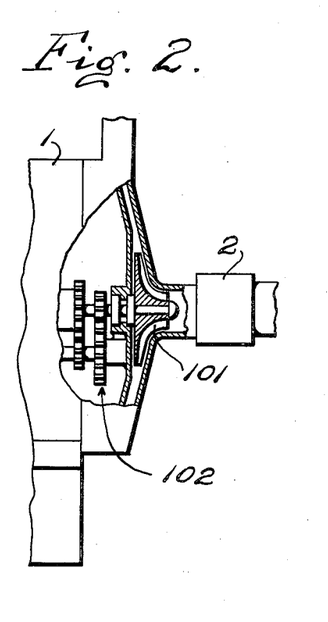
Figure 2 is a fragmentary longitudinal sectional elevation of a modified construction wherein the engine includes a second supercharger.

It is to be further noted that the engine 1 may include an additional blower 101 as shown in Figure 2, driven by means of gears 102 from the engine 1 and inserted between the carburetor 2 and the engine cylinders. Said blower may be of the well known type of superchargers which are employed primarily in radial engines to improve the mixture distribution to the cylinders, and which are characterized by their relatively low peripheral speed.

A pressure regulator, indicated generally at 60, is provided to operate the rod 42. The pressure regulator may be any device capable of displacing the rod 42 in response to a change in the pressure inside the duct 36. In the embodiment shown this regulator includes a metallic bellows 62 sealed under vacuum and provided with a spring 63 adapted to expand said bellows. This bellows acts directly against a similar bellows 64 connected with duct 36. These two bellows act on a lever 66 to operate pistons 68 and 70 which control the admission of pressure fluid to opposite sides of piston 72 which operates the rod 42. The pressure fluid, usually oil from an engine-driven pump, is led into the pipe 74 and returns to the engine crankcase through conduits 76 and 78. The surrounding atmospheric pressure acts on the bellows in opposite directions so that any change of pressure in duct 36 operates the bellows 64 and the piston 72, and returns the pressure in duct 36 to the predetermined value, independently of variations in atmospheric pressure.

A manual control 80, connected with the upper point of lever 66 and adjustable while in flight by the pilot, is provided, whereby the value of the pressure automatically maintained in duct 36 by the regulator 60 may be controlled. It is to be noted that, for a given position of the manual control 80, the absolute pressure in duct 36 and in conduit 4 will have a constant value within the designed altitude.

This value of the pressure in ducts 36 and 4 is dependent upon the load of spring 63 mounted within bellows 62, which load is in turn dependent upon the position of control lever 80. In fact, if we assume that the engine 1 operates under steady conditions with lever 80 adjusted in a certain angular position, there corresponds in conduit 4 and within bellows 64 a definite pressure that balances the resilient load of spring 63 plus the eventual resilient loads of bellows 62 and 64; the pilot valve 68, 70 is in neutral position, and the piston 72 of the servo-motor is stationary. If now the pressure in conduit 4 and within bellows 64 decreases, owing for example to increased altitude, bellows 64 contracts, moving the pilot valve 68, 70 toward the left, and causing piston 72 to be displaced toward the right to actuate either throttle valve 34, or throttle valve 20, in a direction to increase the air pressure in conduit 4. Movement of the piston 72 of the servo-motor will continue until the pressure in duct 4 and within bellows 64 resumes the initial value corresponding to, or determined by, the position in which control lever 80 is adjusted. Obviously, an increase of pressure in duct 4 will set the servo-motor in motion in opposite direction until the pressure therein resumes the initial value determined by the position of control lever 80.

Conversely, when the pilot desires to vary the pressure in conduit 4, for example to increase this pressure, he rotates lever 80 clockwise to a new angular position. This will cause at first clockwise rotation of lever 66 about its middle point and displacement of pilot valve 68, 70 to the left, actuating the servo-motor in a direction to increase the pressure in said conduit and within bellows 64. The latter will then gradually expand, compressing spring 63, rotating lever 66 anticlockwise about its upper end, and displacing pilot valve 68, 70 to the right. Operation of the servo-motor in a direction to increase the supercharging pressure will continue until the pilot valve 68, 70 resumes its neutral position, with the pressure within bellows 64 at a higher value, balancing the increased load of spring 63. In similar manner anticlockwise rotation of control lever 80 to a new angular position will cause the air pressure in conduit 4 to be reduced to and maintained at a correspondingly lower value.

It is therefore apparent that for each given position of control means 80 there will correspond a definite constant value of the pressure in duct 4, or, as expressed in some of the appended claims, that the value of the pressure in said duct is determined by the position of the control means 80. This, obviously, is true within certain limits of altitude, as beyond these limits the supercharging pressure controls become at least in part inoperative.

With the above described arrangement, the power output of engine 1 will increase with the altitude, owing to the corresponding decrease in the exhaust counter-pressure. Instead of a constant absolute pressure in conduit 4, a substantially constant power output of engine 1 at a given speed of the latter may however be obtained with a bellows 62 of smaller displacement than the bellows 64. In fact, if bellows 62 and 64 have different displacements, the pressure regulator is responsive not only to the absolute pressure in conduits 36 and 4, but also to the surrounding atmospheric pressure, and automatically maintains in conduits 36 and 4 an absolute pressure which varies proportionally to changes of the surrounding atmospheric pressure, the ratio of proportionality depending on the ratio of the effective air displacements of said bellows. In particular, with a bellows 62 having smaller displacement than bellows 64, a reduction of the surrounding atmospheric pressure determines a corresponding reduction of the absolute pressure in conduit 4, and it is clear that it will be possible to establish the relative dimensions of bellows 62 and 64 in such a way that a drop in the surrounding pressure, due for example to an increase of altitude, causes a corresponding reduction of supercharging pressure which substantially compensates the effect on the engine power output of the drop of exhaust counter-pressure, thus maintaining the power output of the engine, at a given speed thereof, constant or substantially constant independently of changes of altitude.

Figures 1 and 2 illustrate a powerplant arrangement in which air is suplied to the engine 1 by two superchargers 10 and 101 in series, with an intercooler 26 interposed therebetween, this arrangement being particularly suitable in connection with aircraft powerplants designed for operation at high altitude. When this powerplant is operating under cruising power at moderate or low altitude, the blower 10 may become unnecessary, in which case the regulator 60, together with the spring 48, will cause the motor 30 to operate at idling speed, with the blower 10 rotating at such low speed as to be substantially ineffective and negligible. Under these conditions the pressure regulator 60 actuates the throttle valve 20 exclusively, angularly adjusting the latter automatically to maintain the air pressure in conduit 4 at a value dependent upon the adjustment of control lever 80 and independent of the altitude. Obviously, where steady cruising operation at moderate or low altitudes is expected, the motor 30 instead of being kept idling may be stopped. Furthermore, where operation at high altitude is not contemplated, both the motor 30 and the blower 10 may be removed or eliminated from the powerplant, in which case the upper end of lever 44 may be disconnected from lever 33 and connected with a fixed pivot, the pressure regulator 60 thus being operatively connected with the throttle valve 20 exclusively.

In order to automatically maintain the air temperature in conduit 4 at a predetermined value, a temperature regulator is provided, including a temperature responsive element 82 connected with a bellows 84 acting directly against a similar bellows 86. Bellows 86 is sealed under vacuum and is provided with a spring 87 adapted to expand it against the surrounding pressure. These two bellows act on a lever 88 to operate a servo mechanism similar to that described for the pressure regulator and which it is considered unnecessary to again describe in detail. Temperature changes in conduit 4 will cause a displacement of rod 90 which in turn operates a floating lever 98 whose upper and lower ends control, by means of levers 92 and 94, the valves 28 and 18 respectively. A spring 96 tends to maintain the valve 18 in the position in which cold air only is admitted to the intake of blower 10.

Assuming the temperature of the air at the blower outlet to be equal to the predetermined temperature to be maintained in conduit 4, the valve 28 will be maintained by the regulator in the position shown in the drawings, in which position no amount of air flows through the intercooler 26. A decrease in the temperature around the element 82 will cause a displacement toward the right of rod 90 and thereby operate the valve 18 to reduce the proportion of cold air and increase the proportion of hot air admitted to the blower intake. Conversely, an increase in the temperature around the element 82 will cause rotation of valve 18 in the opposite direction and thereby reduce the temperature at the blower intake, until valve 18 reaches its extreme position corresponding to admission of cold air only. Thereafter, further increase in the temperature will cause the valve 28 to be rotated so as to admit the necessary amount of air to the intercooler. Obviously the temperature regulator, as the pressure regulator, being provided with bellows 84 and 86 of equal diameter, is unaffected by changes in atmospheric pressure.

In the specific embodiment which has been described and illustrated for the purpose of disclosing the invention, the regulator 60 includes bellows 62 and 64 actuating the servo motor 72 in response to changes of induction pressure in order to maintain said pressure automatically at a value corresponding to the setting of the manual control member 80. It is to be clearly understood, however, that according to the invention other devices may be provided in substitution for the bellows 62 and 64 for actuating the servo motor 72 to alter the speed of supercharger 10 and/or the adjustment of throttle valve 18 with changes of operative conditions other than the induction pressure, such for example as operative conditions which are dependent upon or vary with changes in the adjustment of the throttle valve and/or in the supercharger speed. The arrangement may be such that the operative setting of said devices may be adjusted by means of the manual control member 80. It is further to be understood that the invention is not limited to the arrangements so illustrated and described, but that such changes in the type, arrangement and manner of operation of the various elements of the combination, including the means for driving the supercharger at continuously variable speed, the servo motors, the throttle valve, the induction cooler and regulating means therefor, may be resorted to as come within the scope of the appended claims.

In interpreting the following claims, where they are directed to less than all of the elements of the complete systems disclosed, they are to be construed as covering possible uses of the recited elements in installations which lack the non-recited elements.

What I claim is:

1. In combination with an internal combustion engine, a blower to supply a compressed fluid thereto, means for throttling the intake of said blower, a motor to drive said blower at variable speed, means for adjusting the speed of said blower between predetermined minimum and maximum values, control means for regulating the pressure of said fluid supplied to said engine, and means cooperating with said first, second and third mentioned means whereby in response to the adjustment of said control means a certain lower range of pressure of said fluid is obtained by keeping the speed of said blower substantially constant at said minimum value and suitably throttling the intake of said blower, and the values of pressure of said fluid beyond said lower range are obtained by keeping the inlet of said blower wide open and suitably adjusting the speed of said blower beyond said minimum value, thereby avoiding the waste of power that would occur if simultaneously the intake of said blower were partially throttled and the speed thereof adjusted at an unnecessarily high value.

2. In combination with an internal combustion engine, a supercharger to supply a compressed medium thereto, a variable speed motor to drive said supercharger, means for controlling the speed of said supercharger, control means adjustable in operation, means responsive to the pressure of said compressed medium supplied to said engine, said first, second and third mentioned means being operatively interconnected to automatically maintain for each position of said control means a corresponding constant value of the pressure of said compressed medium independently of the surrounding atmospheric pressure.

3. In combination with an internal combustion engine, an internal combustion motor, a blower driven by said motor to supply a compressed medium, a portion of the compressed medium supplied by said blower being delivered to said engine and another portion to said motor, means for adjusting the speed of said blower, and pressure regulating means operating said first mentioned means to maintain the pressure of the medium supplied to said engine substantially constant at a predetermined value independently of changes in the atmospheric conditions.

4. In combination with an internal combustion engine, a centrifugal supercharger to supply a compressed medium thereto, a valve at the intake of said supercharger, a variable speed motor to drive said supercharger, means for adjusting the speed of said motor, regulating means operating said valve and said first mentioned means to control the pressure of the compressed medium supplied to said engine, and means for maintaining said valve wide-open while said motor is operating at any speed above idling.

5. A combination as defined in claim 1, including an intercooler placed between the blower and the engine, a temperature responsive element placed between said intercooler and said engine, means for controlling the heat dissipated by said intercooler, means for admitting a controllable amount of hot air to the intake of said blower, and a temperature regulator operating said two last mentioned means in response to said temperature responsive element to maintain the temperature of the fluid supplied to said engine constant at a predetermined value.

6. In combination with an internal combustion engine, a blower to supply a compressed fluid thereto, a variable speed motor to drive said blower, means for adjusting the speed of said blower whereby the pressure of the fluid supplied to said engine may be controlled, an intercooler placed between said blower and said engine, a temperature responsive element placed between said intercooler and said engine, means for controlling the heat dissipated by said intercooler, means for admitting a controllable amount of hot air to the intake of said blower, and a temperature regulator operating said two last mentioned means in response to said temperature responsive element to maintain the temperature of the fluid supplied to said engine constant at a predetermined value.

7. In combination with an internal combustion engine, a variable speed internal combustion motor, a supercharger driven by said motor and supplying a compressible fluid partly to said engine and partly to said motor, means responsive to the pressure of said fluid supplied to said engine and means actuated by said first mentioned means for adjusting the speed of said supercharger to automatically maintain the pressure of said fluid supplied to said engine independent of variations of the surrounding atmospheric pressure.

8. A combination as defined in claim 7, including means whereby the idling speed of said motor may be governed independently of changes of the pressure of the fluid supplied by said supercharger.

9. A combination as defined in claim 7, including means whereby the relative proportion of fluid supplied by said supercharger to said engine and to said motor may be controlled.

10. In combination with an internal combustion engine, a supercharger to supply a compressible fluid to said engine, means for driving said supercharger at variable speed, means whereby the speed of said supercharger may be varied within designed limits and assume any value comprised within said limits independently of the speed of said engine, means responsive to the pressure of said fluid supplied to said engine, and manual means to control said engine in operation, said second, third and fourth mentioned means being operatively interconnected whereby the pressure of the fluid supplied by said supercharger depends on the adjustment of said manual means, and is independent of the surrounding atmospheric pressure.

11. In combination with an internal combustion engine, a supercharger to supply a compressed fluid thereto, a variable speed motor to drive said supercharger, temperature regulating means whereby the temperature of the compressed fluid supplied to said engine may be held substantially constant at a determined value, means for varying the speed of said motor, means responsive to the pressure of said compressed fluid, control means, said second, third and fourth mentioned means being operatively interconnected whereby the density of the fluid supplied to said engine depends on the adjustment of said control means and may be kept substantially independent of the surrounding atmospheric pressure and temperature.

12. In combination with an internal combustion engine having an induction system, a blower therein driven from said engine, a supercharger in said induction system to supply a compressed fluid to said blower, means for driving said supercharger at variable speed, whereby the speed of said supercharger may vary within predetermined limits and assume any value comprised within said limits independently of the speed of said engine, means for controlling the speed of said supercharger, and means responsive to the pressure of said compressed fluid supplied to said blower for actuating said second mentioned means to automatically maintain the pressure of said compressed fluid supplied to said blower independent of changes of the surrounding atmospheric pressure.

13. In combination with an internal combustion engine having an induction system, a blower therein driven from said engine, a supercharger in said induction system to supply a compressed fluid to said blower, means for driving said supercharger at variable speed whereby the speed of said supercharger may vary within predetermined limits and assume any value comprised within said limits independently of the speed of said engine, means for controlling the speed of said supercharger, means responsive to the pressure of said fluid supplied to said blower for actuating said second mentioned means, a valve in said induction system to restrict the free area thereof, and means whereby said valve is kept open while said supercharger is rotating beyond a determined speed.

14. In combination with an internal combustion engine, a supercharger to supply a compressible medium thereto, an independent motor to drive said supercharger at variable speed, means for adjusting the speed of said supercharger, engine control means, means responsive to the pressure of said medium supplied by said supercharger to said engine, said first, second and third mentioned means being operatively interconnected to maintain for each position of said engine control means a corresponding constant value of the pressure of said medium independent of changes of altitude, whereby the power output of said engine, at a given speed thereof, depends on the adjustment of said control means and increases with an increase of the altitude owing to the corresponding reduction of the engine exhaust counterpressure.

15. A pressure control apparatus for an internal combustion engine comprising a supercharger, a stepless regulatable drive for said supercharger, a conduit joined to said supercharger for conducting air to said engine, a throttle in said conduit, a lever, linkage means between said lever, throttle and stepless drive for opening and closing said throttle upon predetermined movements of said lever without moving said stepless drive from its minimum driving speed position, and for moving said stepless drive to greater than minimum drive position without moving said throttle from open position.

16. An engine having a carburetor, a blower between carburetor and engine cylinders, a supercharger supplying air to said carburetor, means for driving said supercharger at steplessly variable speed, power means controlling the supercharger speed, a bellows device actuating said power means upon changes of carburetor air pressure, and a pressure selector operatively connected with said bellows device to select the carburetor air pressure during engine operation.

17. An aircraft engine having a carburetor, a blower between carburetor and engine cylinders, an intercooler, induction temperature responsive means controlling said intercooler, a supercharger delivering air through said intercooler to said carburetor, means for driving said supercharger at continuously variable speed, power means controlling the supercharger speed, a pressure sensitive device actuating said power means upon changes of pressure between intercooler and carburetor, and a pressure selector operable while the engine is running and connected with the pressure sensitive device to select the carburetor boost.

18. For use with a radial aircraft engine having a carburetor, a centrifugal blower between carburetor and engine cylinders to secure supply of homogeneous mixture to said cylinders, an intercooler, a supercharger delivering air through said intercooler to said carburetor, and means for driving said supercharger at continuously variable speed, a carburetor air density regulator including induction temperature responsive means controlling said intercooler, power means controlling the supercharger speed, a pressure sensitive device actuating said power means upon changes of pressure between intercooler and carburetor, and a boost selector connected with said pressure sensitive device and operable while the engine is running.

19. For use with an aircraft engine having a carburetor, a blower between carburetor and engine cylinders, an intercooler, a supercharger delivering air through said intercooler to said carburetor, and means for driving said supercharger at continuously variable speed, a boost regulator including power means controlling the supercharger speed, a pressure sensitive device actuating said power means upon changes of pressure between intercooler and carburetor, and a boost selector adjustable in operation and connected with said device.

20. An engine, a carburetor, a first stage supercharger delivering air to said carburetor, means for driving said supercharger at steplessly variable speed, speed control means for said supercharger, a second stage supercharger connected between said carburetor and the engine cylinders, a throttling valve on the inlet side of said first stage supercharger, and a carburetor air inlet pressure regulator including an oil actuated servo piston operating on said throttling valve and speed control means, balanced oil control valve means for said servo piston whereby the adjustment of said valve means is unaffected by changes of oil pressure, two coaxial bellows actuating said valve means, one of said bellows being evacuated, and conduit means maintaining the pressure within the other bellows substantially at carburetor air inlet pressure.

21. In combination, an aircraft engine, a carburetor, a first stage supercharger delivering air to said carburetor, means for driving said supercharger at continuously variable speed, speed control means for said supercharger, a second stage supercharger connected between said carburetor and the engine cylinders, a throttle valve upstream of said carburetor, and a carburetor air inlet pressure regulator including a servo motor operating on said valve and speed control means, two coaxial bellows controlling said servo motor, one of said bellows being evacuated, conduit means maintaining carburetor air inlet pressure within the other bellows, and a manual control member for altering the operative adjustment of said bellows while the engine is running.

22. An engine having a supercharger, means for driving said supercharger at continuously variable speed, supercharger speed control means, a throttle, and a pressure regulator including pressure responsive means operating on said throttle and supercharger speed control means in sequence.

23. An engine induction system including a throttle, a supercharger between said throttle and the engine cylinders, means for driving said supercharger at continuously variable speed, speed control means for said supercharger, and an induction pressure regulator including means responsive to changes of induction pressure between said supercharger and the engine cylinders operating on said throttle and speed control means in succession.

24. An aircraft engine having an induction system, a throttle and a supercharger in said induction system, means for driving said supercharger at variable speed, supercharger speed control means, a pressure regulator including pressure responsive means connected with said induction system downstream with respect to said throttle and supercharger and operating on said throttle and supercharger speed control means in sequence, and control means operable during flight while the engine is running to alter the operative setting of said pressure responsive means.

25. In combination with an engine having an induction system, first and second stage superchargers connected with said system, controllable intercooler means between said superchargers, means responsive to the temperature in said induction system for controlling said intercooler means to keep said temperature substantially constant, throttle means for controlling the pressure in said induction system, control means, means responsive to the pressure in said system, and an operative connection between said three last mentioned means for actuating said throttle means to keep the pressure and thereby the density in said induction system at a value substantially determined by the adjustment of said control means.

26. In combination with an engine having a supercharger and controllable intercooler means therebetween, means responsive to the temperature of the air supplied to said engine for controlling said intercooler means to keep said temperature substantially constant, throttle means, control means, means responsive to the pressure of said air supplied to said engine, and an operative connection for actuating said throttle means to keep the pressure and thereby the density of said air supplied to said engine at a value substantially determined by the adjustment of said control means.

27. In combination with an engine having a supercharger, cold and warm air inlets therefor, means for controlling the relative amounts of cold and warm air admitted thereto, controllable intercooler means between said supercharger and engine, induction air temperature responsive means for actuating said first and second mentioned means to keep said induction air temperature substantially constant, throttle means, control means, means responsive to the induction air pressure, and an operative connection between said three last mentioned means for actuating said throttle means to keep said induction air at a pressure and thereby at a density substantially determined by the adjustment of said control means.

28. In combination with a supercharged engine having a controllable intercooler and a throttle, engine induction density regulating means including temperature responsive means for controlling said intercooler, and operatively interconnected manual control means and means responsive to an operative condition varying with changes of adjustment of said throttle for controlling the latter.

29. In combination with an engine having a controllable intercooler and a throttle, a regulating system including temperature responsive means for controlling said intercooler, fluid containing means wherein the pressure varies with changes of adjustment of said throttle, and operatively interconnected manual control means and means responsive to the pressure in said fluid containing means for actuating said throttle.

30. In combination with an engine having a controllable intercooler and a throttle, a regulating system including temperature responsive means for controlling said intercooler, and operatively interconnected manual control means and engine induction pressure responsive means for controlling said throttle.

31. In combination with an engine having an air intake, an alternate controllable hot air intake, a controllable intercooler, and temperature responsive means for controlling said alternate intake and said intercooler.

32. In combination with an engine having a controllable alternate hot air intake, a controllable intercooler and a throttle, a regulating system including temperature responsive means for controlling said intake and intercooler, and manually adjustable operative condition responsive means for controlling said throttle.

33. In combination with an aircraft engine having a first stage supercharger, means for driving the latter at continuously variable speed, speed control means for said supercharger, an engine driven second stage supercharger, throttle means, a controllable intercooler between said superchargers, and a carburetor between said intercooler and second stage supercharger, an engine induction density regulating system including temperature responsive means for controlling said intercooler, and common operative condition responsive means adjustable while in flight for automatically actuating said speed control means and throttle means.

34. In combination with an aircraft engine having a first stage supercharger, means for driving the latter at variable speed, speed control means for said supercharger, an engine driven second stage supercharger, throttle means, a controllable intercooler between said superchargers, and an alternate controllable hot air intake, an engine manifold fluid density regulating system including temperature responsive means for controlling said intercooler and intake, and common means responsive to an operative condition dependent upon the speed of said first stage supercharger and upon the adjustment of said throttle means and adjustable while in flight for automatically actuating said speed control means and throttle means.

35. An engine supercharging system including two serially connected superchargers one of which is driven at continuously variable speed, speed control means for the latter, a throttle, a controllable intercooler, temperature responsive means for controlling the latter, and pressure responsive means for controlling said throttle and speed control means.

36. An engine supercharging system including a supercharger drivable at any speed, means for controlling the speed of the latter, throttle means, a controllable intercooler, temperature responsive means for controlling the latter, and operative condition responsive means controllable while in operation for actuating said two first mentioned means automatically.

37. A supercharging system for supplying precompressed air to an aircraft engine having a carburetor, a throttle and an engine driven blower, said system including a supercharger, means for driving the latter at continuously variable speed, a controllable intercooler, an alternate controllable hot air intake, and a control system including means for controlling said alternate air intake, temperature responsive means for controlling said intercooler, means for controlling the adjustment of said throttle and the speed of said supercharger, manual control means, operative condition responsive means, and an operative connection between said three last mentioned means.

38. In combination with an aircraft engine having a carburetor and a gear-driven centrifugal blower between said carburetor and engine, a supercharging device including controllable air intercooler means, a supercharger delivering air through said intercooler means to said carburetor, cold air intake means and hot air intake means for said supercharger, means for automatically regulating the amount of hot air admitted to said supercharger, means for automatically controlling said intercooler means, means for driving said supercharger at steplessly variable speed, servo-motor means for controlling said speed thereof, manual control means for selecting the induction pressure, and induction pressure responsive means connected with said manual control means and servo-motor means for actuating the latter automatically to keep said induction pressure at the selected value.

39. An engine having a gear-driven blower, a supercharger delivering air through said blower to said engine, means for driving said supercharger at variable speed, servo-motor means for controlling said speed thereof, and an induction pressure and temperature control system including cooler means between said supercharger and engine, cold air intake means and hot air intake means for said supercharger, means for automatically regulating the hot air admitted to said supercharger, manual control means, and means responsive to an operative condition dependent upon said speed and operatively connected with said manual control means and servo-motor means for controlling the latter automatically to maintain said operative condition at a value dependent upon the adjustment of said control means.

40. An aircraft powerplant including an engine, a supercharger, cooler means between said supercharger and engine, cold air intake means and hot air intake means for said supercharger, valve means for regulating the hot air admitted to said supercharger, means for controlling said valve means automatically, means for driving said supercharger at continuously variable speed, servo-motor means for controlling said speed thereof, manual control means for selecting the magnitude of an operative condition dependent upon said speed, and means responsive to said operative condition and connected with said control means and servo-motor means for controlling the speed of said supercharger automatically to maintain said operative condition at the selective magnitude.

41. An engine, a supercharger therefor, means for driving said supercharger at continuously variable speed, power means for controlling said speed, a member controlling said power means, engine induction pressure responsive means, control means adjustable during operation, and an operative connection between said pressure responsive means, control means and member determining the position of said member in dependence upon the adjustment of said pressure responsive means and control means and independently of the position of said power means.

42. An engine having an induction system, a gear-driven supercharger and a supercharger driven at continuously variable speed serially arranged in said system, speed control means for the latter supercharger, an automatic control device including power means actuated by and means responsive to the induction pressure between superchargers and operating on said speed control means.

43. An engine, a supercharger therefor, a throttle, supercharger control means, and common pressure responsive means actuating said throttle and control means in sequence.

44. In combination with an engine having an induction system, first and second stage superchargers connected with said system, controllable intercooler means between said superchargers, means responsive to the temperature in said system for controlling said intercooler means to keep said temperature substantially constant, throttle means, control means, means responsive to the pressure in said system and to the surrounding pressure, and an operative connection between said three last mentioned means for actuating said throttle means to keep the pressure and thereby the density in said induction system at a value substantially determined by the surrounding pressure and the adjustment of said control means.

45. In combination with an engine having a supercharger, controllable intercooler means between said supercharger and engine, means responsive to the temperature of the air supplied to said engine for controlling said intercooler means to keep said temperature constant, throttle means, control means, means responsive to the surrounding atmospheric pressure and to the pressure of said air supplied to said engine, and an operative connection between said three last mentioned means for actuating said throttle means to vary said pressure and in turn the density of said air supplied to said engine as a preselected function of the surrounding atmospheric pressure and the adjustment of said control means.

46. An aircraft engine regulator comprising a servo motor for controlling the engine manifold pressure, servo motor control means, a housing, two coaxial expansible pressure responsive chambers connected end to end and surrounded by atmospheric pressure in said housing, one of said chambers being sealed and the other containing fluid at manifold pressure, a member whose adjustment may be varied while in operation, and means for operatively connecting said chambers and said member with said control means for actuating the latter in response to changes of said manifold pressure, of the atmospheric pressure and of the adjustment of said member.

47. In combination with an engine having a controllable intercooler and a throttle, regulating means including temperature responsive means for controlling said intercooler, and operatively interconnected manual control means and means responsive to the surrounding pressure and to an operative condition varying with changes of adjustment of said throttle for controlling the latter.

48. In combination with an engine having a controllable intercooler, a throttle, and fluid containing means wherein the pressure varies with changes of adjustment of said throttle, a regulating system including temperature responsive means for controlling said intercooler, and operatively interconnected manual control means and means responsive to the atmospheric pressure and to the pressure in said containing means for actuating said throttle.

49. In combination with an aircraft engine having a first stage supercharger, means for driving the latter at continuously variable speed, means for controlling said speed thereof, an engine driven second stage supercharger, a controllable intercooler between said superchargers, and throttle means, a regulating system including temperature responsive means for controlling said intercooler, means responsive to the atmospheric pressure and to an engine operative pressure which varies with changes of said speed and with changes of adjustment of said throttle means, manual control means adjustable while in operation, and an operative connection between said speed control means, said throttle means and said two last mentioned means.

50. In combination with an engine having a variable speed supercharger and a throttle, a regulator including common servomotor means for controlling the speed of said supercharger and the adjustment of said throttle, control means for said servomotor means, a housing and two coaxial expansible pressure responsive chambers therein connected with one another and with said control means for actuating the latter in response to variations of atmospheric and engine induction pressures.

51. In combination with an engine having a supercharger driven at continuously variable speed and a throttle, common servomotor means for controlling said throttle and the speed of said supercharger, pressure responsive means for actuating said servomotor means in response to variations of atmospheric and engine induction pressures, and manual control means for altering the operative adjustment of said pressure responsive means.

52. An aircraft engine, manual means for controlling the engine power, a supercharger for said engine, means for driving said supercharger at infinitely variable speed, a servo-motor to control said speed, servo-motor control means, first means for actuating said control means in response to changes of atmospheric pressure and variations of an operative condition dependent upon the supercharger speed, and second means adjustable by said manual means during engine operation to alter the setting of said first means.

53. An aircraft engine, manual means for controlling engine power, a supercharger for said engine, means for driving the latter at infinitely variable speed, a servo-motor to control the speed of said supercharger, servo-motor control means, resilient means connected with said control means, means for actuating said control means in opposition to said resilient means upon variations of atmospheric pressure and changes of an engine operative condition dependent on said supercharger speed, and control means operable by said manual means to alter the amount of opposition exerted by said resilient means.

54. An aircraft engine, a supercharger therefor, means for driving said supercharger at continuously variable speed, power means for controlling said speed, a member controlling said power means, engine induction pressure and atmospheric pressure responsive means, pilot control means adjustable during flight, and an operative connection between said pressure responsive means, control means and member determining the position of said member in dependence upon the adjustment of said pressure responsive means and control means and independently of the adjustment of said power means.

55. An engine having an induction system, a gear-driven supercharger and a supercharger driven at variable speed serially arranged in said system, speed control means for the latter supercharger, and means responsive to changes of induction pressure between superchargers and to atmospheric pressure to actuate said speed control means.

56. An engine, a supercharger therefor, means for driving said supercharger at variable speed, supercharger speed control means, a throttle, and a pressure responsive device actuating said control means and throttle upon changes of two pressures which vary as a function of engine operation.

57. An engine, a supercharger therefor, a throttle, supercharger control means, a pressure responsive device actuating said throttle and control means upon changes of atmospheric pressure and a pressure which varies as a function of engine operation, and a manual control to alter the setting of said device during operation.

FERDINANDO CARLO REGGIO.

Certificate of Correction

Patent No. 2,403,398.　　　　　　　　　　　　　　　　　July 2, 1946.

FERDINANDO CARLO REGGIO

It is hereby certified that errors appear in the printed specification of the above numbered patent requiring correction as follows: Column 2, line 17, beginning with the words "In the following" strike out all to and including "art will permit." in line 20, same column; column 11, line 59, claim 24, strike out the words "during flight"; column 14, lines 32 and 33, claim 40, for "selective" read *selected* ; line 50, claim 42, after the word and comma "supercharger," insert *and* ; line 51, same claim, strike out "and"; and that the said Letters Patent should be read with these corrections therein that the same may conform to the record of the case in the Patent Office.

Signed and sealed this 24th day of September, A. D. 1946.

[SEAL]

LESLIE FRAZER,
*First Assistant Commissioner of Patents.*